April 14, 1970  C. D. SNELLING  3,506,541
APPARATUS AND METHOD FOR CULTIVATING
CELLS, TISSUES AND THE LIKE
Filed May 20, 1966  2 Sheets-Sheet 1

INVENTOR.
CHARLES D. SNELLING
BY
Hopgood & Calimafde
ATTORNEYS.

INVENTOR.
CHARLES D. SNELLING
BY
Hofgood & Calimafde
ATTORNEYS.

_United States Patent Office_

3,506,541
Patented Apr. 14, 1970

---

3,506,541
APPARATUS AND METHOD FOR CULTIVATING CELLS, TISSUES AND THE LIKE
Charles D. Snelling, Allentown, Pa., assignor to New Brunswick Scientific Co., Inc., New Brunswick, N.J., a corporation of New Jersey
Filed May 20, 1966, Ser. No. 551,633
Int. Cl. C12b 1/14
U.S. Cl. 195—109
4 Claims

---

ABSTRACT OF THE DISCLOSURE

A method and apparatus are disclosed for carrying out gas-liquid reactions in which a container containing a liquid is provided with a plurality of intercommunicating levels one above the other through which a gas is passed while in intimate contact with the liquid at each of said levels.

---

This invention relates to an apparatus and method for cultivating biological cells, tissues and the like and, in particular, to an apparatus and method for providing a large interchange area between a gaseous phase and a liquid nutrient in the promotion of growth of biological cells.

In the growth of certain organisms and cells, especially the mammalian cells, for example, kidney cells which are generally grown in a nutrient liquid medium, such as fortified blood serum, gases (e.g., oxygen) are generally employed under conditions calling for efficient mass transfer and gas-liquid interchange. In order to grow cells which are morphologically sound and normal, it is important to avoid rupturing the delicate and unnatural cell membranes. This generally involves avoiding vigorous agitation, large shear forces in the bath, strong bath currents and the like. Prior to the presnt invention these factors have been mutually contradictory since, in order to promote gas exchange with nutrient liquid, it was not uncommon to stir the biological broth and bubble air through it. However, these techniques of mixing have usually resulted in killed cells and in unnatural morphology. Bubbling air into the bath usually results in uncontrollable foam problems. Uncontrolled foaming is known to destroy extra cellular proteins.

It is an object of my invention to provide a novel mixing apparatus and method for growing biological cells.

Another object is to porvide an apparatus and method for aerating biological nutrient liquids while avoiding uncontrolled foaming.

A further object is to provide an apparatus and method for aerating (e.g., adding such gases as oxygen, nitrogen, carbon dioxide, ammonia, etc.) a liquid by creating and maintaining in the liquid a large gas-liquid interchange area, without the necessity of vigorously agitating the bath or bubbling gas therethrough.

Figure 1:
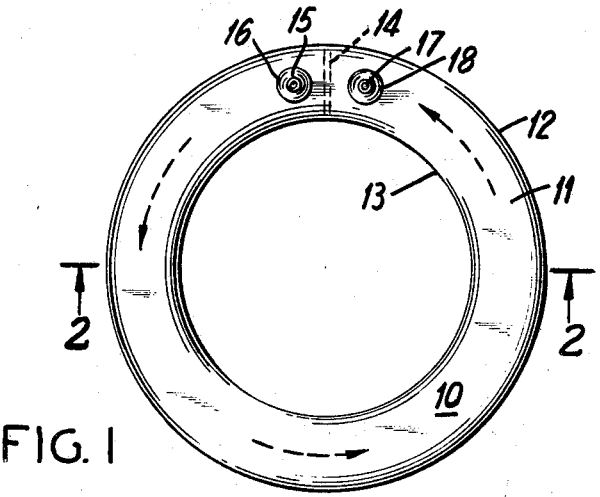
Figure 2:
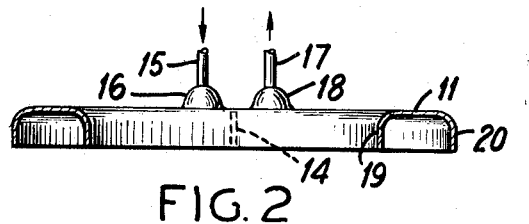
Figure 4:
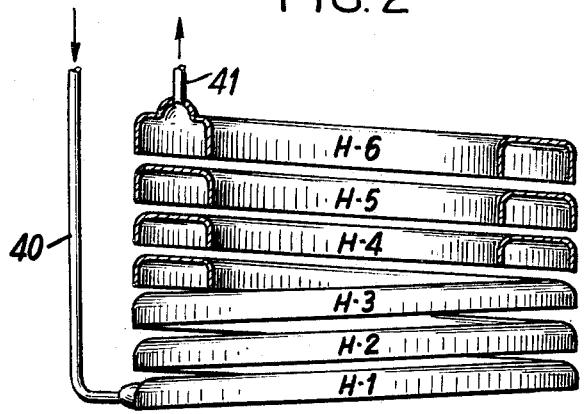
Figure 3:
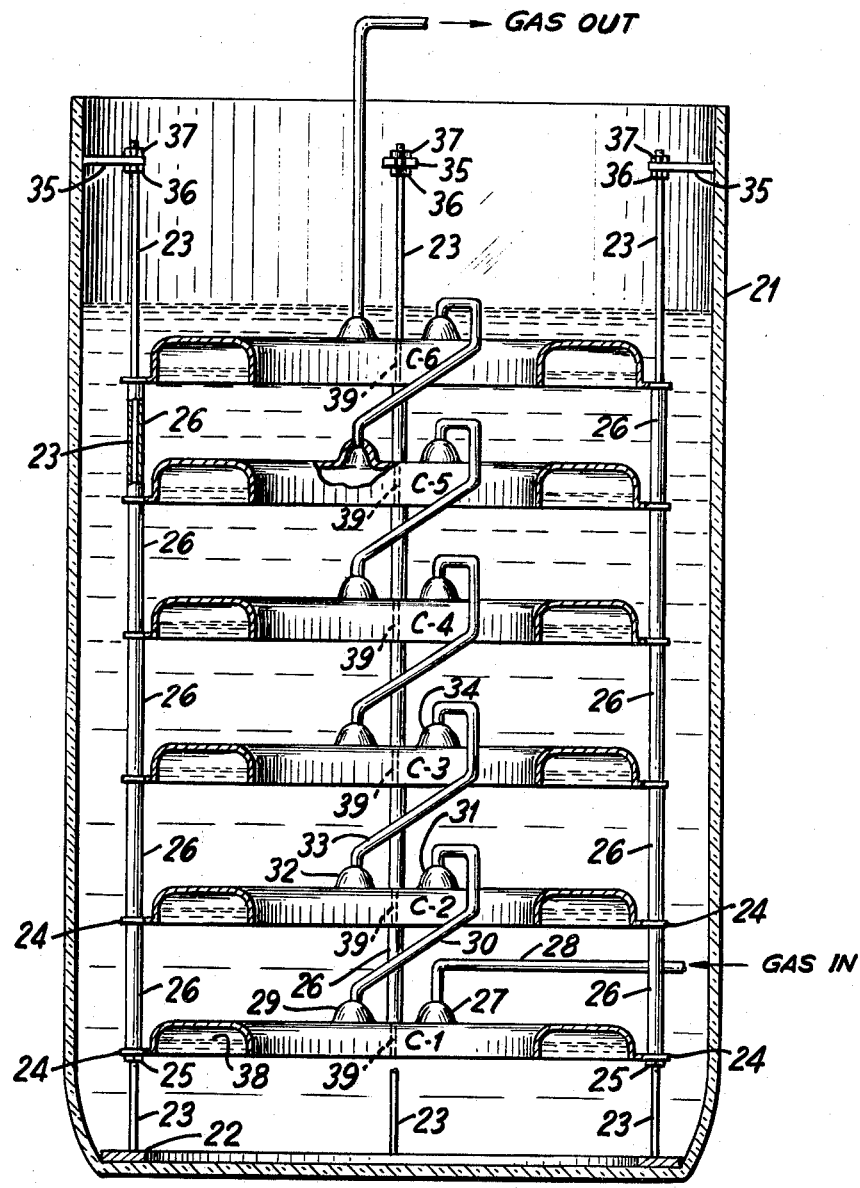

These and other objects and advantages will more clearly appear when taken in conjunction with the following disclosure and the accompanying drawing, wherein:

FIGS. 1 and 2 depict one embodiment of the apparatus provided by the invention, FIG. 2 being a cross-section taken along line 2—2 of FIG. 1, FIG. 3 is illustrative of a multi-level aerating device utilizing the apparatus embodiment of FIG. 1 and 2; and FIG. 4 shows another form of the apparatus depicted in FIG. 1 except that the multi-level elements are portions of the helix whereby there is a continuous communication between levels.

I have found that with my invention I can effect gas-liquid interchange in a biological nutrient bath over a rather large interchange area without resorting to the generally harmful conventional type mixing techniques. Broadly stated, I provide a method of promoting the growth of biological cells, tissues and the like cultures in a nutrient bath wherein I produce a laminar flow of the gaseous phase throughout at least one submerged level in said bath and maintaining flowing communication throughout said level of flow, whereby contact between said gaseous phase and said bath is maintained over a large interchange area, while inhibiting turbulence in said bath. By laminar flow is meant a flow of a smooth sheet-like stream of gas at the gas-liquid interface within the bath, this being achieved substantially simultaneously, where a plurality of levels of the bath are involved.

One apparatus embodiment for carrying out the method of the invention comprises, in addition to a container for the bath, a plurality of inverted channels spaced one above the other, whereby to provide a plurality of gas-liquid interchange levels ranging from a first level to an $N^{th}$ level, said gas-liquid interchange levels inter-communicating with each other. Means for feeding gas into the channel of the first level is provided, said gas moving by laminar flow to and through each successive level and means for withdrawing gas emitted at the $N^{th}$ level. The apparatus concept is also applicable to the gas phase treatment of a single level within said bath.

The vessel for holding the biological nutrient may be cylindrical, spherical, rectangular or any suitable shape. The inverted channels, which are preferably annular in shape, may be placed in the vessel one at a time, one above the other, in spaced substantially horizontal relationship, each channel communicating with the other. Typical inverted annular channels in a 12 inch diameter vessel would be 11½ inches O.D., 8½ inches I.D. and would be in the neighborhood of ¾ inch to 1 inch deep. In effect, the inverted channel of the foregoing type looks like a dish with a hole in it.

As illustrative of one embodiment of a circular channel, reference is made to FIGS. 1 and 2, FIG. 1 being a plan view of the annular channel 10 looking at the inverted face 11 having an outer periphery 12 and an inner periphery 13, the channel being divided by partition 14. On the left side of the partition, a gas inlet tube 15 is provided which communicates with bell 16 (note FIG. 2), which bell opens into and communicates with the interior of the channel. To the right of partition 14, an outlet gas tube 17 is provided, also coupled to a bell 18, which bell likewise communicates with the interior of the channel. As shown in FIG. 2, the interior of channel 10 is defined by annular side walls 19 and 20. When the channel as shown in FIG. 2 is suberged in a liquid and gas supplied to the channel through tube 15 at a controlled rate of flow, liquid in the channel is displaced by the gas sufficiently to provide an uninterrupted laminar pathway around the circular channel, whereby the gas flows smoothly in the direction of the arrows shown in FIG. 1 and exits through bell 18 and tube 17 (FIG. 2). By having a series of intercommunicating channels one above the other of the type shown in FIGS. 1 and 2, a large gas-liquid interchange area is possible throughout substantially the volume of the biological fluid.

One embodiment of such a channel assembly is shown in FIG. 3 comprising six spaced levels of inverted channels ranging from level C–1 to level C–6. The channels are assembled in fixed spaced relationship within a cylindrical vessel 21 which may be made of glass or other suitable material. The channels may be made of a corrosion resistant alloy such as a molybdenum containing stainless steel or also from glass or other suitable material inert to biological fluids. As shown in FIG. 3, the vessel 21 is provided with a fixture comprising an annular base 22 resting on the bottom of the vessel, the base having connected vertically to it four equally spaced rods 23 (three are shown). Each of the channels are provided with ears 24 having forked openings in which the rods are received in assembling the aerating devices within the vessel.

Thus, the first channel is fitted to the rods and the channel supported in position of level C–1 via nuts 25. Four spacers 26 are then slipped onto the rods and a second channel fitted in place at gas-liquid interchange level C–2. The first channel at level one has hollow bell 27 which communicates with a gas inlet tube 28, which tube extends to the outside of the vessel and connects to a source of gas (not shown). Channels C–2 to C–6 are similarly stacked via the rods and separated by spacers 26 as shown, each of the channels being fluidly coupled to the other. As will be noted, each of the channels are partitioned at 39.

Thus, channel C–1 is coupled to C–2 via bell 29 and tube 30 to bell 31 of channel C–2. In the alternative, tube 30 may be directed to within the confines of channel C–2, with its end terminating within bell 31 and so on up through the levels. In the embodiment of FIG. 3, channel C–2 is coupled via bell 32 and tube 33 to bell 34 of channel C–3, channel C–3 being in turn coupled to C–4 and so on up to channel C–6. In short the assembly comprises a stack of intercommunicating channels.

In order to insure that the assembly is fixed against movement due to the buoyancy effect of the gas entering the channels, the rods are anchored as shown by being fastened to projecting ears 35 having a forked opening for receiving the rods, the rods of the fixture being fastened in position via nuts 36 and 37 locked to each side of the ears.

Air pumped into channel C–1 via tube 28 displaces enough water therein to a level, for example, as designated by numeral 38. The air moves around the channel as a thin sheet-like stream and then exits through bell 29 and tube 30 into gas-liquid interchange level or channel C–2 where the liquid is similarly displaced to form an air-liquid interface, the air similarly circulating at each level up to level C–6.

The air input is regulated so that there is a continuous flow throughout each of the channels and, therefore, enough air must be supplied to maintain this continuous flow while avoiding the influx of excess air so that the air does not overflow the side walls of the channels and bubble-up to the surface. The exit tube from each of the channels may be restricted by means of an orifice so that a proper amount of air is allowed to leave each channel. The size of the orifice may change at each level, the orifice increasing in size at succeeding levels. If desirable, a float valve may be provided at each level to control the thickness of the airstream at each level.

Since the hydrostatic pressure differs at each level, it will be appreciated that for a given gas pressure, the depth of liquid may differ in each of the channels. In order to insure there is no overflowing of air at the upper portion of the assembled channels where the hydrostatic pressure is lower, e.g., channels C–5 and C–6, the side walls of the channels may be deeper. As shown at level C–6 of FIG. 3, it will be noted that the channel has a greater depth than the channel at the bottom level C–1. Of course, the channels can all have the same depth so long as the over-all depth is sufficient to accommodate the differences in water levels in each of the channels during the aeration treatment of the liquid in the vessel.

As an alternative arrangement, instead of having the channels substantially level as shown in FIG. 3, the channels may be slightly inclined and arranged spirally so that the thin sheet of gas admitted at the bottom spirals within the channel upward to the top of the liquid. In other words, the channels are formed contiguously as one helical channel, whereby each level communicates with the other as shown in FIG. 4. There the channel is shown spiralling upward from level H–1 to level H–6, the gas being admitted to level H–1 via entrance pipe at a pressure sufficient to cause the gas to remain confined within the channel and move spirally upward to exit pipe 41. Thus, in effect, the levels of inverted channels are formed into a helical configuration so as to provide a continuous passageway from the first level to the $N^{th}$ level.

As has been stated hereinbefore, the advantages of the invention are severalfold. For example, by using the concept of the inverted channels, the gas-liquid surface area is greatly enlarged. Calculations have indicated that it is possible to increase the gas-liquid surface area for a cylindrical vessel with a depth twice its diameter by a factor of ten or more.

Secondly, because the gas is continually moving through the channel with some velocity, gas to liquid transfer is still further enhanced.

Thirdly, instead of having only a gas-liquid surface area at the top of the liquid bath as in an ordinary vessel, the invention enables setting up the gas-liquid interchange area at the bottom of the vessel or at any spaced levels throughout the cross-section of the bath. This greatly reduces the need for the mass circulation of the liquid.

Fourthly, the invention has the added advantage that by utilizing substantially annular inverted channels in which the gas is caused to flow continuously either in the clockwise or counterclockwise direction while rising up in the liquid, substantial stirring and circulation of the liquid is set up by virtue of the friction of the moving gas at the gas-liquid interface. This type of circulation is desirable as it is gentle and free of shear forces and yet distributed throughout the total depth of the liquid, thereby aiding mass transfer in tissue culture.

Fifthly, as a still further advantage, it is observed that by designing the channels with the proper dimensions and configuration and using the proper gas flow, it is possible to eliminate substantially the formation of bubbles and foam. This is because the flow of gas from the bottom to the top of the liquid can be maintained as a continuous sheet or film much as laminar flow.

By confining the flow of gas in inverted channels submerged in the liquid, it is also possible to pulse the flow of the gas by rhythmically changing the rate of flow of gas over a time interval, whereby to greatly increase the amount of stirring or agitation of the liquid in the vessel. Each pulse causes a bulge in the thin stream of gas, thus producing a controlled wave-like effect at the gas-liquid interface, which when carefully done will result in greatly increased stirring with less undesirable side effects normally prevalent with conventional stirring and mixing techniques.

While the invention is described with respect to its use in the cultivation of biological cells, live tissues or the like, it will be appreciated that it may have utility in other chemical reacting systems in which a gas-liquid interface or interchange is involved.

Although the present invention has been described in conjunction with preferred embodiments, it is to be understood that modifications and variations may be resorted to without departing from the spirit and scope of the invention as those skilled in the art will readily understand.

What is claimed is:

1. In an apparatus for growing biological cultures wherein a container is employed for confining a nutrient bath therein and has means for supplying a gaseous phase to said bath for promoting the growth of said culture, an improved gas delivery and guiding means comprising a plurality of inverted annular channels spaced one above the other whereby to provide a plurality of gas-liquid interchange levels ranging from a first level to an $N^{th}$ level, said gas-liquid interchange level intercommunicating with each other, means for feeding gas to a first level, and means for withdrawing gas from the $N^{th}$ level, each of said inverted annular channels being mounted on a fixture in spaced relationship, a transverse partition in each of said channels closing off one section of the channel from the other, gas inlet means coupled to one side of the partition of the first channel, gas outlet means coupled to the other side of the partition of said first channel, means serially and fluidly coupling each channel to an adjacent channel, whereby said channels are in intercommunicating relationship from the first to the $N^{th}$ level.

2. In a method of promoting the growth of biological cells, tissues and the like cultures involving an interchange between a gaseous phase and a bath of nutrient liquid, the improvement which comprises, providing a confined bath of said nutrient liquid, producing a sheet-like laminar flow of said gaseous phase throughout a plurality of levels in said bath of liquid ranging from a first level to an $N^{th}$ level, and maintaining flowing communication of said gaseous phase between said levels of flow, whereby contact between said gaseous phase and said bath is maintained over a large interchange area while inhibiting turbulence and bubbling of said bath.

3. The method of claim 2 wherein said plurality of levels in said bath of liquid are spirally interconnected from a first level to an $N^{th}$ level, wherein gas is fed to said first level and withdrawn from the $N^{th}$ level, whereby contact between said gaseous phase and said bath is maintained over a large interchange area while inhibiting turbulence and bubbling of said bath.

4. The method of claim 2 wherein the flow of gas throughout the plurality of levels is pulsed.

References Cited

UNITED STATES PATENTS

| | | | |
|---|---|---|---|
| 1,504,265 | 8/1924 | Palmer | 261—123 |
| 3,278,271 | 10/1966 | Kono et al. | 261—79.1 |

ALVIN E. TANENHOLTZ, Primary Examiner

U.S. Cl. X.R.

195—142; 261—123